United States Patent
Kamiya

(10) Patent No.: US 9,840,062 B2
(45) Date of Patent: Dec. 12, 2017

(54) FIBER-REINFORCED COMPOSITE MATERIAL

(71) Applicant: KABUSHIKI KAISHA TOYOTA JIDOSHOKKI, Kariya-shi, Aichi-ken (JP)

(72) Inventor: Ryuta Kamiya, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 15 days.

(21) Appl. No.: 15/037,530

(22) PCT Filed: Oct. 29, 2014

(86) PCT No.: PCT/JP2014/078684
§ 371 (c)(1),
(2) Date: May 18, 2016

(87) PCT Pub. No.: WO2015/079854
PCT Pub. Date: Jun. 4, 2015

(65) Prior Publication Data
US 2016/0288454 A1    Oct. 6, 2016

(30) Foreign Application Priority Data

Nov. 27, 2013 (JP) .................. 2013-245128

(51) Int. Cl.
*B32B 5/12* (2006.01)
*C08J 5/24* (2006.01)
(Continued)

(52) U.S. Cl.
CPC ................. *B32B 5/12* (2013.01); *B32B 5/10* (2013.01); *B32B 5/26* (2013.01); *B32B 27/38* (2013.01);
(Continued)

(58) Field of Classification Search
CPC ..... Y10T 428/24116; Y10T 428/24132; Y10T 428/24099; B32B 5/12; B32B 5/26; B32B 5/08
See application file for complete search history.

(56) References Cited

U.S. PATENT DOCUMENTS

2007/0117486 A1    5/2007 Serillon
2010/0275764 A1    11/2010 Egres, Jr.

FOREIGN PATENT DOCUMENTS

| JP | 1-225538 A | 9/1989 |
|---|---|---|
| JP | 7-43501 U | 8/1995 |
| WO | 2009/088551 A2 | 7/2009 |

OTHER PUBLICATIONS

Communication dated Oct. 20, 2016 from the European Patent Office in counterpart Application No. 14865157.3.

*Primary Examiner* — Alexander Thomas
(74) *Attorney, Agent, or Firm* — Sughrue Mion, PLLC

(57) ABSTRACT

A fiber-reinforced composite material has a fabric base material including laminated obliquely-crossed fabric layers, each of which is configured by weaving first and second reinforced fiber bundles, which obliquely cross each other. In adjacent two of the fabric layers, one of an orientation of the first reinforced fiber bundles and an orientation of the second reinforced fiber bundles in one fabric layer is the same as one of an orientation of the first reinforced fiber bundles and an orientation of the second reinforced fiber bundles of the other fabric layer. A single-orientation layer is placed between the adjacent fabric layers such that an orientation of fiber bundles of the single-orientation layer is the same as an orientation of reinforced fiber bundles having the same orientation as each other in the adjacent fabric layers.

3 Claims, 2 Drawing Sheets

(51) Int. Cl.
  *B32B 5/26*   (2006.01)
  *B32B 5/10*   (2006.01)
  *B32B 27/38*  (2006.01)

(52) U.S. Cl.
  CPC .............. *C08J 5/24* (2013.01); *B32B 2250/00* (2013.01); *B32B 2250/03* (2013.01); *B32B 2250/04* (2013.01); *B32B 2250/05* (2013.01); *B32B 2250/20* (2013.01); *B32B 2260/021* (2013.01); *B32B 2260/046* (2013.01); *B32B 2262/0253* (2013.01); *B32B 2262/0269* (2013.01); *B32B 2262/10* (2013.01); *B32B 2262/101* (2013.01); *B32B 2262/105* (2013.01); *B32B 2262/106* (2013.01); *B32B 2307/50* (2013.01)

FIBER-REINFORCED COMPOSITE MATERIAL

CROSS REFERENCE TO RELATED APPLICATIONS

This application is a National Stage of International Application No. PCT/JP2014/078684 filed Oct. 29, 2014, claiming priority based on Japanese Patent Application No. 2013-245128 filed Nov. 27, 2013, the contents of all of which are incorporated herein by reference in their entirety.

TECHNICAL FIELD

The present invention relates to a fiber-reinforced composite material having a fabric base material including laminated obliquely-crossed fabric layers. Each of the obliquely-crossed fabric layers is configured by weaving a plurality of first reinforced fiber bundles and a plurality of second reinforced fiber bundles. The first reinforced fiber bundles are arranged in parallel to each other, and the second reinforced fiber bundles obliquely cross the first reinforced fiber bundles and are arranged in parallel to each other.

BACKGROUND ART

Fiber-reinforced composite materials are used as lightweight and high-strength materials. A fiber-reinforced composite material has a plurality of reinforced fiber bundle layers. Each of the reinforced fiber bundle layers is formed by arranging a plurality of fiber bundles, each of which is formed by bundling fibers. The fiber-reinforced composite material is formed by impregnating, with matrix resin, reinforced fiber base material including the laminated reinforced fiber bundle layers. For example, Patent Documents 1 and 2 disclose fiber base materials as reinforced fiber base materials, in which fabric layers are laminated. Each of the fabric layers is configured by weaving warp threads (first reinforced fiber bundles) and weft yarns (second reinforced fiber bundles) by plain weave, twill, satin weave, and the like.

The fabric base material of Patent Document 1 is formed by alternately laminating, for example, fabric layers each including warp threads oriented at 0 degrees and weft yarns oriented at 90 degrees and fabric layers each including warp threads oriented at +45 degrees and weft yarns oriented at −45 degrees. This easy manufacturing method allows the fabric base material to have quasi-isotropy. Thus, the fabric base material of Patent Document 1 is excellent in manufacturing costs and productivity.

The fabric base material of Patent Document 2 is formed by piling fabric layers (obliquely-crossed fabric layers) while shifting by 45 degrees. Each fabric layer includes warp threads and weft yarns crossing at the narrow angle of 45 degrees, i.e., at the wide angle of 135 degrees.

PRIOR ART DOCUMENTS

Patent Documents

Patent Document 1: Japanese Laid-Open Patent Publication No. 1-225538

Patent Document 2: Japanese utility model publication No. 7-43501

SUMMARY OF THE INVENTION

Problems that the Invention is to Solve

In the fabric base material of Patent Document 1, in adjacent fabric layers in the lamination direction of the fabric layers, one of the adjacent fabric layers has warp threads and weft yarns oriented differently from the warp threads and weft yarns of the other one. Thus, the adjacent angle between the adjacent fabric layers in the lamination direction of the fabric layers is large to create internal stress between the adjacent fabric layers. This may cause separation between the layers.

In the fabric base material of Patent Document 2, the adjacent angle between adjacent obliquely-crossed fabric layers is smaller than that of the fabric base material in Patent Document 1. However, unless the weave patterns of the adjacent obliquely-crossed fabric layers exactly conform to each other, the overlapping area of the threads becomes small. This may eventually cause separation of layers between the adjacent obliquely-crossed fabric layers.

It is an objective of the present invention to provide a fiber-reinforced composite material that limits separation of layers between adjacent obliquely-crossed fabric layers in the lamination direction of the obliquely-crossed fabric layers.

Means for Solving the Problems

A fiber-reinforced composite material that achieves the above objective has a fabric base material including laminated obliquely-crossed fabric layers. Each of the obliquely-crossed fabric layers is configured by weaving a plurality of first reinforced fiber bundles and a plurality of second reinforced fiber bundles. The first reinforced fiber bundles are arranged in parallel to each other, and the second reinforced fiber bundles obliquely cross the first reinforced fiber bundles and are arranged in parallel to each other. The obliquely-crossed fabric layers are laminated such that, in adjacent two of the obliquely-crossed fabric layers in a lamination direction of the obliquely-crossed fabric layers, one of an orientation of the first reinforced fiber bundles and an orientation of the second reinforced fiber bundles in one obliquely-crossed fabric layer is the same as one of an orientation of the first reinforced fiber bundles and an orientation of the second reinforced fiber bundles of the other obliquely-crossed fabric layer. A single-orientation layer, which includes a plurality of fiber bundles arranged in parallel to each other, is placed between the adjacent obliquely-crossed fabric layers in the lamination direction of the obliquely-crossed fabric layers. The single-orientation layer is placed between the adjacent obliquely-crossed fabric layers such that an orientation of the fiber bundles of the single-orientation layer is the same as an orientation of reinforced fiber bundles having the same orientation as each other in the adjacent obliquely-crossed fabric layers.

MODES FOR CARRYING OUT THE INVENTION

A fiber-reinforced composite material 10 according to one embodiment will now be described with reference to FIGS. 1 and 2.

Figure 1:
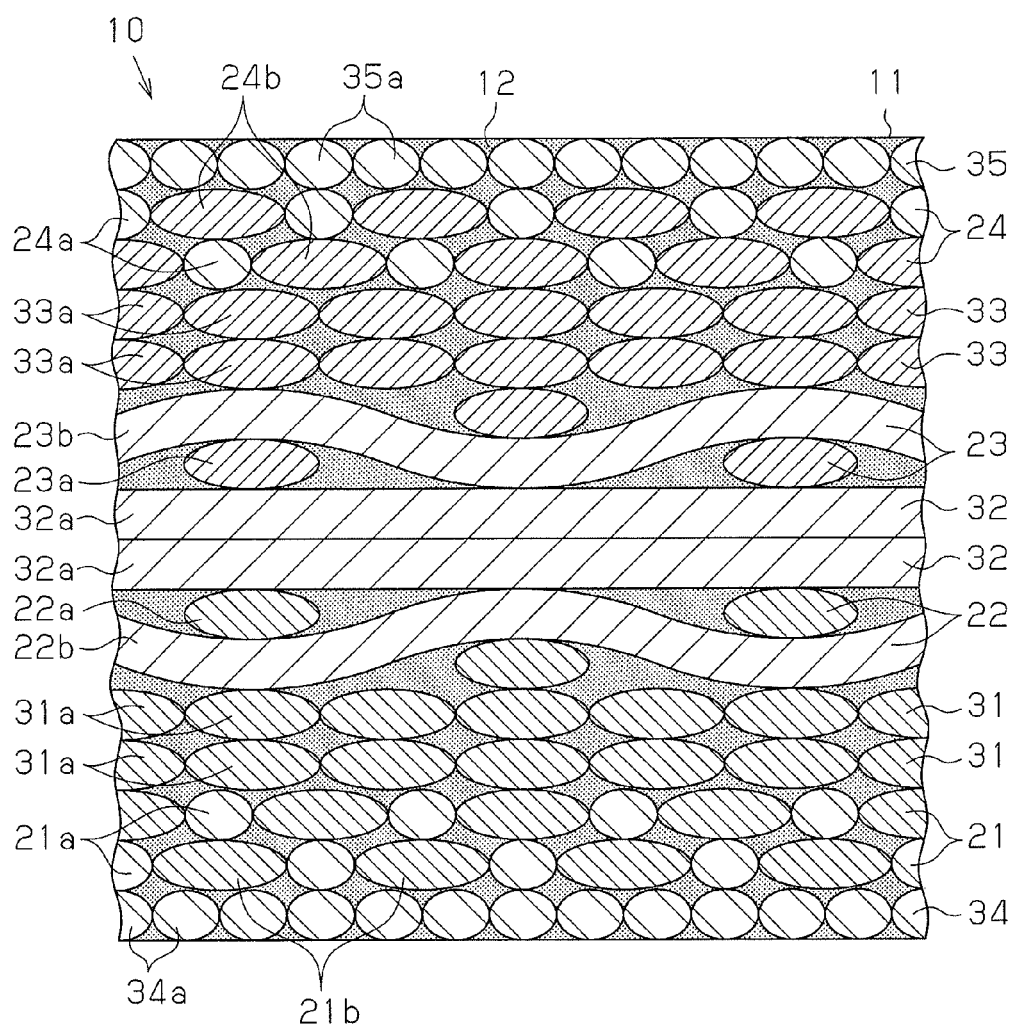
FIG. 1 is a cross-sectional view of a fiber-reinforced composite material according to an embodiment.

As shown in FIG. 1, the fiber-reinforced composite material 10 is formed by impregnating a fabric base material 11 with matrix resin 12 to form a composite of the fabric base material 11 and the matrix resin 12. In the present embodiment, epoxy resin is used as the matrix resin 12.

Figure 2:
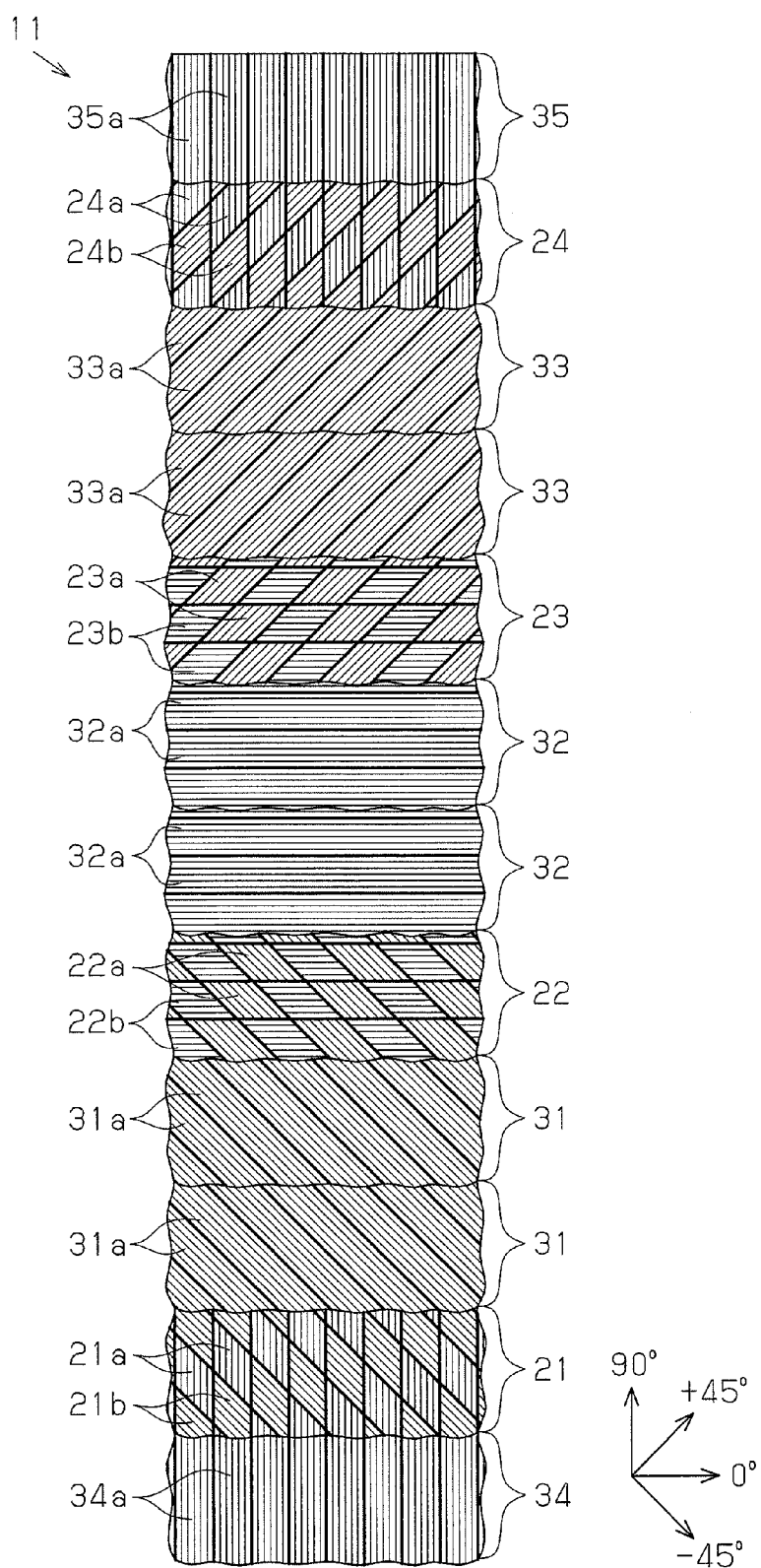
FIG. 2 is a schematic plan view of a part of the fabric base material of FIG. 1.

As shown in FIG. 2, the fabric base material 11 has a first obliquely-crossed fabric layer 21. The first obliquely-crossed fabric layer 21 includes warp threads 21a as first reinforced fiber bundles arranged in parallel to each other at 90 degrees of orientation angle and weft yarns 21b as second reinforced fiber bundles arranged in parallel to each other at −45 degrees of orientation angle, which obliquely cross the warp threads 21a. The warp threads 21a and the weft yarns 21b are weaved by plain weave. The fabric base material 11 also has a second obliquely-crossed fabric layer 22. The second obliquely-crossed fabric layer 22 includes warp threads 22a as first reinforced fiber bundles arranged in parallel to each other at −45 degrees of orientation angle and weft yarns 22b as second reinforced fiber bundles arranged in parallel to each other at 0 degrees of orientation angle, which obliquely cross the warp threads 22a. The warp threads 22a and the weft yarns 22b are weaved by plain weave.

The fabric base material 11 further has a third obliquely-crossed fabric layer 23. The third obliquely-crossed fabric layer 23 includes warp threads 23a as first reinforced fiber bundles arranged in parallel to each other at +45 degrees of orientation angle and weft yarns 23b as second reinforced fiber bundles arranged in parallel to each other at 0 degrees of orientation angle, which obliquely cross the warp threads 23a. The warp threads 23a and the weft yarns 23b are weaved by plain weave. The fabric base material 11 also has a fourth obliquely-crossed fabric layer 24. The fourth obliquely-crossed fabric layer 24 includes warp threads 24a as first reinforced fiber bundles arranged in parallel to each other at 90 degrees of orientation angle and weft yarns 24b as second reinforced fiber bundles arranged in parallel to each other at +45 degrees of orientation angle, which obliquely cross the warp threads 24a. The warp threads 24a and the weft yarns 24b are weaved by plain weave.

Thus, in the first to fourth obliquely-crossed fabric layers 21, 22, 23, and 24, the weft yarns 21b, 22b, 23b, and 24b are oriented at 45 degrees relative to the respective warp threads 21a, 22a, 23a, and 24a. The term "orientation" refers to a direction in which fibers or fiber bundles extend. The fabric base material 11 is configured to have quasi-isotropy by laminating the first to fourth obliquely-crossed fabric layers 21, 22, 23, and 24 in this order. The warp threads 21a, 22a, 23a, and 24a and the weft yarns 21b, 22b, 23b, and 24b are fiber bundles in which fibers (carbon fibers) are bundled.

The second obliquely-crossed fabric layer 22 is laminated over the first obliquely-crossed fabric layer 21 such that the orientation of the warp threads 22a of the second obliquely-crossed fabric layer 22 is the same as the orientation of the weft yarns 21b of the first obliquely-crossed fabric layer 21. The third obliquely-crossed fabric layer 23 is laminated over the second obliquely-crossed fabric layer 22 such that the orientation of the weft yarns 23b of the third obliquely-crossed fabric layer 23 is the same as the orientation of the weft yarns 22b of the second obliquely-crossed fabric layer 22. The fourth obliquely-crossed fabric layer 24 is laminated over the third obliquely-crossed fabric layer 23 such that the orientation of the weft yarns 24b of the fourth obliquely-crossed fabric layer 24 is the same as the orientation of the warp threads 23a of the third obliquely-crossed fabric layer 23.

Two first single-orientation layers 31 are placed between the first obliquely-crossed fabric layer 21 and the second obliquely-crossed fabric layer 22. Each of the first single-orientation layers 31 includes fiber bundles 31a arranged in parallel to each other at −45 degrees of orientation angle. Thus, the first single-orientation layer 31 is placed between the first and second obliquely-crossed fabric layers 21 and 22 such that the orientation of the fiber bundles 31a is the same as the orientation of the weft yarns 21b of the first obliquely-crossed fabric layer 21 and the orientation of the warp threads 22a of the second obliquely-crossed fabric layer 22.

Two second single-orientation layers 32 are placed between the second obliquely-crossed fabric layer 22 and the third obliquely-crossed fabric layer 23. Each of the second single-orientation layers 32 includes fiber bundles 32a arranged in parallel to each other at 0 degrees of orientation angle. Thus, the second single-orientation layer 32 is placed between the second and third obliquely-crossed fabric layers 22 and 23 such that the orientation of the fiber bundles 32a is the same as the orientation of the weft yarns 22b of the second obliquely-crossed fabric layer 22 and the orientation of the weft yarns 23b of the third obliquely-crossed fabric layer 23.

Two third single-orientation layers 33 are placed between the third obliquely-crossed fabric layer 23 and the fourth obliquely-crossed fabric layer 24. Each of the third single-orientation layers 33 includes fiber bundles 33a arranged in parallel to each other at +45 of orientation angle. Thus, the third single-orientation layer 33 is placed between the third and fourth obliquely-crossed fabric layers 23 and 24 such that the orientation of the fiber bundles 33a is the same as the orientation of the warp threads 23a of the third obliquely-crossed fabric layer 23 and the orientation of the weft yarns 24b of the fourth obliquely-crossed fabric layer 24.

A fourth single-orientation layer 34 is placed on the opposite side of the first obliquely-crossed fabric layer 21 from the first single-orientation layer 31 in the lamination direction of the first to fourth obliquely-crossed fabric layers 21, 22, 23, and 24. The fourth single-orientation layer 34 includes fiber bundles 34a arranged in parallel to each other at 90 degrees of orientation angle. Thus, the fourth single-orientation layer 34 is placed such that the orientation of the fiber bundles 34a is the same as the orientation of the warp threads 21a of the first obliquely-crossed fabric layer 21.

A fifth single-orientation layer 35 is placed on the opposite side of the fourth obliquely-crossed fabric layer 24 from the third single-orientation layer 33 in the lamination direction of the first to fourth obliquely-crossed fabric layers 21, 22, 23, and 24. The fifth single-orientation layer 35 includes fiber bundles 35a arranged in parallel to each other at 90 degrees of orientation angle. Thus, the fifth single-orientation layer 35 is placed such that the orientation of the fiber bundles 35a is the same as the orientation of the warp threads 24a of the fourth obliquely-crossed fabric layer 24. In each of the fiber bundles 31a, 32a, 33a, 34a, and 35a, fibers (carbon fibers) are bundled.

Operation of the present embodiment will now be described.

The first obliquely-crossed fabric layer 21 and the second obliquely-crossed fabric layer 22, which are adjacent to each other in the lamination direction of the first to fourth obliquely-crossed fabric layers 21, 22, 23, and 24, are laminated with the two first single-orientation layers 31 in between. The weft yarns 21b of the first obliquely-crossed fabric layer 21 overlap the fiber bundles 31a of the first single-orientation layer 31 placed on the first obliquely-crossed fabric layer 21. Thus, the overlapped portion has no space for the matrix resin 12 to get into. In addition, the warp threads 22a of the second obliquely-crossed fabric layer 22 overlap the fiber bundles 31a of the first single-orientation layer 31 placed under the second obliquely-crossed fabric layer 22. Thus, the overlapped portion has no space for the matrix resin 12 to get into. This limits separation of layers between the first obliquely-crossed fabric layer 21 and the second obliquely-crossed fabric layer 22, which are adjacent to each other in the lamination direction of the first to fourth obliquely-crossed fabric layers 21, 22, 23, and 24.

In the same manner, the second obliquely-crossed fabric layer 22 and the third obliquely-crossed fabric layer 23, which are adjacent to each other in the lamination direction of the first to fourth obliquely-crossed fabric layers 21, 22, 23, and 24, are laminated via the two second single-orientation layers 32. In addition, the third obliquely-crossed fabric layer 23 and the fourth obliquely-crossed fabric layer 24, which are adjacent to each other in the lamination direction of the first to fourth obliquely-crossed fabric layers 21, 22, 23, and 24, are laminated via the two third single-orientation layers 33. This limits separation of layers between the second obliquely-crossed fabric layer 22 and the third obliquely-crossed fabric layer 23 and between the third obliquely-crossed fabric layer 23 and the fourth obliquely-crossed fabric layer 24.

Furthermore, the warp threads 21a of the first obliquely-crossed fabric layer 21 overlap the fiber bundles 34a of the fourth single-orientation layer 34 placed under the first obliquely-crossed fabric layer 21. Thus, the overlapped portion has no space for the matrix resin 12 to get into. In the same manner, the warp threads 24a of the fourth obliquely-crossed fabric layer 24 overlap the fiber bundles 35a of the fifth single-orientation layer 35 placed on the fourth obliquely-crossed fabric layer 24. Thus, the overlapped portion has no space for the matrix resin 12 to get into.

According to the present embodiment, the following advantages are achieved.

(1) The first to fourth obliquely-crossed fabric layers 21 to 24 are laminated such that, in two obliquely-crossed fabric layers that are adjacent to each other in the lamination direction of the first to fourth obliquely-crossed fabric layers 21 to 24, one of the obliquely-crossed fabric layers has the warp threads (21a to 24a) or the weft yarns (21b to 24b) oriented the same as the corresponding warp threads (21a to 24a) or the corresponding weft yarns (21b to 24b) of the other obliquely-crossed fabric layer. Each of the first to third single-orientation layers 31 to 33, which includes the fiber bundles 31a to 33a arranged in parallel to each other, is placed between the corresponding adjacent obliquely-crossed fabric layers in the lamination direction. Each of the first to third single-orientation layers 31 to 33 is placed between the corresponding adjacent obliquely-crossed fabric layers such that the orientation of the corresponding fiber bundles 31a to 33a is the same as the orientation of reinforced fiber bundles (21a to 24a, 21b to 24b) having the same orientation in the corresponding adjacent obliquely-crossed fabric layers. This provides threads overlapping area enough for avoiding separation of layers between adjacent obliquely-crossed fabric layers in the lamination direction without aligning the weaves in the adjacent obliquely-crossed fabric layers. As a result, separation of layers between adjacent obliquely-crossed fabric layers in the lamination direction is limited.

(2) In each of the first to fourth obliquely-crossed fabric layers 21 to 24, the orientation of the weft yarns 21b (22b, 23b, or 24b) is at 45 degrees relative to the orientation of the corresponding warp threads 21a (22a, 23a, or 24a). In other words, the first to fourth obliquely-crossed fabric layers 21 to 24 are not of different types from each other, but are the same type. The first to fourth obliquely-crossed fabric layers 21 to 24, which are of one type, are laminated while shifting by 45 degrees between adjacent obliquely-crossed fabric layers in the lamination direction. This easy lamination method allows the fabric base material 11 to have quasi-isotropy and the orientations of reinforced fiber bundles (21a to 24a, 21b to 24b) are the same between adjacent obliquely-crossed fabric layers in the lamination direction.

(3) Each set of two single-orientation layers 31 to 33 is placed between the corresponding adjacent obliquely-crossed fabric layers. This further improves the quasi-isotropy of the fabric base material 11.

(4) The fourth single-orientation layer 34 is placed on the opposite side of the first obliquely-crossed fabric layer 21 from the first single-orientation layer 31 in the lamination direction of the first to fourth obliquely-crossed fabric layers 21 to 24. In addition, the fifth single-orientation layer 35 is placed on the opposite side of the fourth obliquely-crossed fabric layer 24 from the third single-orientation layer 33 in the lamination direction of the first to fourth obliquely-crossed fabric layers 21 to 24. Thus, unevenness of the top and bottom surfaces of the fabric base material 11 is decreased compared to a case in which the first obliquely-crossed fabric layer 21 and the fourth obliquely-crossed fabric layer 24 are exposed as the top and bottom surfaces of the fabric base material 11. This reduces resin pools formed on the top and bottom of the fabric base material 11.

The above-illustrated embodiment may be modified in the following forms.

The fourth single-orientation layer 34 and the fifth single-orientation layer 35 may be omitted.

Each of the first to third single-orientation layers 31 to 33 may be single-layered between the corresponding adjacent obliquely-crossed fabric layers.

In the above-illustrated embodiment, the first to fourth obliquely-crossed fabric layers 21 to 24 are configured by weaving by plain weave. However, the weave method may be twill or satin.

Thermosetting resin other than epoxy resin may be used as the matrix resin 12.

A resin other than a thermosetting resin may be used as the matrix resin 12.

The first to fourth obliquely-crossed fabric layers 21 to 24 and the first to fifth single-orientation layers 31 to 35 may be bound in the lamination direction using threads extending in the thickness direction.

Fibers used in the warp threads 21a to 24a, weft yarns 21b to 24b, and fiber bundles 31a to 35a are not limited to carbon fiber. For example, inorganic fiber such as glass fiber and ceramic fiber may be used. Alternatively, high-strength organic fibers such as aramid fiber, poly-p-phenylenebenzobisoxazole fiber, polyarylate fiber, and ultra-high molecular weight polyethylene fiber may be used.

In each of the first to fourth obliquely-crossed fabric layers 21 to 24, the orientation of the corresponding weft yarns 21b, 22b, 23b, or 24b may be at, e.g., 60 degrees relative to the orientation of the corresponding warp threads 21a, 22a, 23a, or 24a. The angle may be modified as long as the orientation of warp threads 21a to 24a is oblique to the orientation of the respective weft yarns 21b to 24b.

The invention claimed is:

1. A fiber-reinforced composite material comprising a fabric base material including laminated obliquely-crossed fabric layers, wherein each of the obliquely-crossed fabric layers is configured by weaving a plurality of first reinforced fiber bundles and a plurality of second reinforced fiber bundles, wherein the first reinforced fiber bundles are arranged in parallel to each other, and the second reinforced fiber bundles obliquely cross the first reinforced fiber bundles and are arranged in parallel to each other, the obliquely-crossed fabric layers are laminated such that, in adjacent two of the obliquely-crossed fabric layers in a lamination direction of the obliquely-crossed fabric layers, one of an orientation of the first reinforced fiber bundles and an orientation of the second reinforced fiber bundles in one obliquely-crossed fabric layer is the same as one of an orientation of the first reinforced fiber bundles and an orientation of the second reinforced fiber bundles of the other obliquely-crossed fabric layer, a single-orientation layer, which includes a plurality of fiber bundles arranged in parallel to each other, is placed between the adjacent obliquely-crossed fabric layers in the lamination direction of the obliquely-crossed fabric layers, and the single-orientation layer is placed between the adjacent obliquely-crossed fabric layers such that an orientation of the fiber bundles of the single-orientation layer is the same as an orientation of reinforced fiber bundles having the same orientation as each other in the adjacent obliquely-crossed fabric layers.

2. The fiber-reinforced composite material according to claim 1, wherein, in each of the obliquely-crossed fabric layers, the orientation of the second reinforced fiber bundles is at 45 degrees relative to the orientation of the first reinforced fiber bundles.

3. The fiber-reinforced composite material according to claim 1, wherein the single-orientation layer is one of two single-orientation layers placed between the adjacent obliquely-crossed fabric layers.

* * * * *